United States Patent
Burger et al.

(10) Patent No.: US 6,614,391 B1
(45) Date of Patent: Sep. 2, 2003

(54) DEVICE FOR DETERMINING THE FILL LEVEL OF A FILLING SUBSTANCE IN A CONTAINER

(75) Inventors: Stefan Burger, Reinsdorf (DE); Klaus-Peter Oberle, Weilheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/070,420

(22) PCT Filed: Sep. 1, 2000

(86) PCT No.: PCT/EP00/08546

§ 371 (c)(1),
(2), (4) Date: Sep. 20, 2002

(87) PCT Pub. No.: WO01/20273

PCT Pub. Date: Mar. 22, 2001

(30) Foreign Application Priority Data

Sep. 15, 1999 (DE) .......................................... 199 44 103

(51) Int. Cl.$^7$ ................................................ G01S 13/08
(52) U.S. Cl. ..................... 342/124; 342/175; 73/290 R; 343/772
(58) Field of Search ................................ 342/124, 175; 324/642; 331/96; 333/22 F, 252; 343/772, 785, 786; 73/290 R

(56) References Cited

U.S. PATENT DOCUMENTS

| | | | |
|---|---|---|---|
| 3,146,410 A | | 8/1964 | Butler ....................... 333/21 R |
| 3,597,708 A | * | 8/1971 | Perreault ................... 333/22 F |
| 4,462,007 A | * | 7/1984 | Shirai ........................... 331/96 |
| 4,994,818 A | | 2/1991 | Keilmann .................... 343/786 |
| 5,600,327 A | * | 2/1997 | Shingyoji et al. ........... 342/175 |
| 5,877,663 A | * | 3/1999 | Palan et al. ................. 333/252 |
| 5,880,698 A | * | 3/1999 | Burger ........................ 343/772 |
| 5,943,908 A | * | 8/1999 | Innes et al. ................ 73/290 R |
| 6,295,018 B1 | * | 9/2001 | Diede et al. ................. 342/124 |
| 6,320,532 B1 | * | 11/2001 | Diede ......................... 342/124 |
| 6,353,418 B1 | * | 3/2002 | Burger et al. ............... 343/786 |

FOREIGN PATENT DOCUMENTS

| | | |
|---|---|---|
| DE | G9312251.9 | 1/1994 |
| DE | 19545493 A1 | 6/1997 |
| EP | 0821431 A2 | 1/1998 |
| EP | 0883205 A2 | 12/1998 |
| EP | 0947812 A1 | 10/1999 |

OTHER PUBLICATIONS

Patent Abstracts of Japan, vol. 008, No. 091, Apr. 26, 1984, JP 59 011002, Matsushita Electric Ind. Co., Ltd.
Patent Abstracts of Japan, vol. 004, No. 097, Jul. 12, 1980, JP 55 060302, Toshiba Corp.

* cited by examiner

Primary Examiner—John B. Sotomayor
(74) Attorney, Agent, or Firm—Jones, Tullar & Cooper, P.C.

(57) ABSTRACT

The invention relates to a device for determining the fill level of a filling substance in a container. The device includes a signal generator unit which generates high-frequency signals, a transmitter/receiver pair which transmits the signals via an antenna and receives the signals which have been reflected on the surface of the filling substance. A coaxial line is also included which has an inner conductor and an outer conductor for bearing the signals, and an evaluation unit which determines the fill level in the container using the transit time of the signals. The antenna has a wave duct which is delimited by a rear wall. A send line is provided on the rear wall of the wave duct, which runs substantially within the wave duct, whereby a first end section of the send line is connected to the inner conductor of the coaxial line.

6 Claims, 3 Drawing Sheets

DEVICE FOR DETERMINING THE FILL LEVEL OF A FILLING SUBSTANCE IN A CONTAINER

BACKGROUND OF THE INVENTION

1. Field of the Invention

The invention relates to a device for determining the fill level of a filling substance in a container having a signal generating unit which generates high-frequency signals, having a transmitter/receiver unit, which transmits the signals via an antenna and receives the signals reflected from the surface of the filling substance, having a coaxial line with an inner conductor and an outer conductor for carrying the signals, and having an evaluation unit, which from the transit time of the signals ascertains the fill level in the container; the antenna has a waveguide, defined by a back wall, and a send line is provided on the back wall of the waveguide, which send line extends essentially inside the waveguide, and a first end section of the send line is connected to the inner conductor of the coaxial line.

2. Related Art

Transit time methods utilize the physical principle according to which the transit distance is equal to the product of the transit time and the rate of propagation. In the case of fill level measurement, the transit distance equals twice the spacing between the antenna and the surface of the filling substance. The useful echo signal, that is, the signal reflected from the surface of the filling substance, and its transit time are determined from the so-called echo function, or digitized envelope curve, and the envelope curve represents the amplitudes of the echo signals as a function of the spacing between the antenna and the surface of the filling substance. The fill level itself is then obtained from the difference between the known spacing between the antenna and the bottom of the container and the spacing, determined by the measurement, between the surface of the filling substance and the antenna. All the known methods that make it possible to measure relatively short distances by means of reflected microwaves can be used. The best-known examples are pulse radar and frequency modulation continuous wave radar (FMCW radar).

In pulse radar, short microwave pulses are transmitted periodically. In the FMCW method, a continuous microwave is transmitted, which is periodically frequency-modulated linearly, for instance in accordance with a sawtooth function. The frequency of the received echo signal therefore, compared to the frequency that the transmitted signal has at the instant of reception, has a frequency difference, which depends on the transit time of the echo signal. The frequency difference between the transmitted signal and the received signal, which can be obtained by mixing the two signals and evaluating the Fourier spectrum of the mixed signal, is thus equivalent to the spacing between the reflecting surface and the antenna. Moreover, the amplitudes of the spectral lines of the frequency spectrum, obtained by Fourier transformation correspond to the echo amplitudes. This Fourier spectrum in this case therefore represents the echo function.

Electromagnetic waves propagate in coaxial lines without dispersion by the transversal-electromagnetic mode (TEM mode). This mode is therefore especially well suited for transporting wave packets or electromagnetic waves that have a certain frequency bandwidth. Fed-in wave packets undergo practically no propagation in that case; in linearly frequency-modulated microwaves as well, a deviation in linearity is largely avoided.

For oriented transmission of electromagnetic waves by means of an antenna, modes are preferably employed whose broadcast characteristic has a pronounced forward lobe. The transverse electric 11 mode ($TE_{11}$ mode), which is capable of propagation in round waveguides, has this property. As a function of the dimensions of the antenna used as the waveguide, a frequency range exists within which the $TE_{11}$ mode is the only mode capable of propagation. Above this frequency range, higher modes, such as the $TM_{01}$ mode, are also capable of propagation but are less well suited to the oriented transmission of microwaves.

From German Utility Model DE-G 93 12 251.9, it has become known to incorporate the sending lobe laterally into the antenna embodied as a round waveguide. A disadvantage of such an arrangement is that the laterally positioned sending lobe generally requires an additional housing, for protecting the coaxial line connected to the sending lobe. This increases the diameter, compared to an arrangement in which the inputting of the microwaves takes place through a back wall of the antenna. Another disadvantage of this prior art is that because of the asymmetry of the arrangement, not only the $TE_{11}$ mode but higher modes as well are excited. Higher modes, however, have a different broadcast characteristic and are therefore less well suited to oriented broadcasting.

From European Patent Disclosure EP 0 821 431 A2, a device has become known which is capable of generating a mode whose broadcast characteristic has a pronounced forward lobe. Moreover, this device can be used over a wide frequency range. To that end, the signals are input from the back side of the round waveguide acting as an antenna. The inputting itself is done over a trapezoidal send line, which is disposed on the back wall of the antenna and extends essentially within the interior of the antenna. One end of the send line is connected to the inner conductor of the coaxial line carrying the signals; the other end of the send line is put into electrical contact with the back wall of the antenna.

SUMMARY OF THE INVENTION

It is the object of the invention to provide a device for determining the fill level of a filling substance in a container that is distinguished by a simple structure.

This object is attained in that a second end section of the send line is disposed freely and essentially parallel to the back wall of the waveguide; and that the spacing between the second end section of the send line and the back wall of the waveguide is essentially $\lambda/8$, where $\lambda$ is the wavelength of the high-frequency signals carried in the waveguide. The symbol $\lambda$ represents the wavelength of the high-frequency signals carried in the waveguide at a frequency to be transmitted. This frequency is for instance the mean frequency in the frequency spectrum of a high-frequency pulse to be transmitted, or the mean frequency of a linearly frequency-modulated FMCW transmission signal.

Because of the axial inputting, the device of the invention is distinguished by a slender design. The inputting does not—as in the case of lateral inputting—exceed the dimensions of the round waveguide. It can therefore be mounted without difficulty even on containers with narrow openings. Moreover, because of the straight inputting, neither angled plugs nor line angles, which would adversely affect the propagation of the high-frequency signals, are necessary. In addition, because of the slight spacing of $\lambda/8$ between the second end section of the send line and the back wall, the antenna can have shorter dimensions than the antennas known until now. In them, the corresponding spacing has always been given as $\lambda/4$.

In an advantageous embodiment of the device of the invention, it is provided that the coaxial line is flush at the front with the back wall of the waveguide. As a result, the high mechanical effort and expense necessary in the case of German Patent Disclosure DE 195 45 493 A1 for passing the coaxial line through the back wall into the waveguide of the antenna is avoided.

An advantageous embodiment of the device of the invention provides that the first end section and the second end section of the send line are disposed essentially perpendicular to one another. The advantage of this embodiment is self-evident: The send line can be fabricated quite simply by appropriate bending. Moreover, the disposition of a sending lobe on the free end, as provided for instance in DE 195 45 493 A1, is superfluous in conjunction with the device of the invention.

In a preferred refinement of the device of the invention, the send line is disposed on a printed circuit board secured in the antenna. This makes producing the device of the invention substantially easier.

Moreover, an advantageous embodiment of the device of the invention provides a dielectric in the waveguide of the antenna, which fills the waveguide at least in the environment of the send line. The dielectric is for instance PTFE (polytetrafluoroethylene).

DESCRIPTION OF THE DRAWINGS

In a further embodiment of the device of the invention, the antenna can be secured to a container via a securing device, for instance via a flange or a male thread.

FIG. 1 shows a schematic illustration of the device of the invention. A solid or liquid filling substance 2 is stored in a container 4. To determine the fill level, the fill level measuring instrument 1 of the invention is used, which is mounted in an opening 5 in the cap of the container 4. Via the antenna 10, transmission signals generated in the signal generation and transmitter unit 6; 7, in particular microwaves, are broadcast in the direction of the surface 3 of the filling substance 2. At the surface 3, the transmitted signals are partly reflected as echo signals. These echo signals are received in the reception/evaluation unit 8; 14 and evaluated. By means of the transmission/reception shunt 9, in the example shown the transmitter unit 6 and the receiver unit 7 are decoupled from one another. If a transmitter unit 6 and a separate receiver unit 7 are used, then the transmission/reception shunt 9 can naturally be dispensed with.

In FIG. 2, a schematic illustration of a first embodiment of the device of the invention can be seen. In the case shown, the coaxial line 11 is shown in detail between the transmission/reception shunt 9 and the antenna 10. The antenna comprises a waveguide 16, which is closed off on one of its face ends by a back wall.

Figure 1:
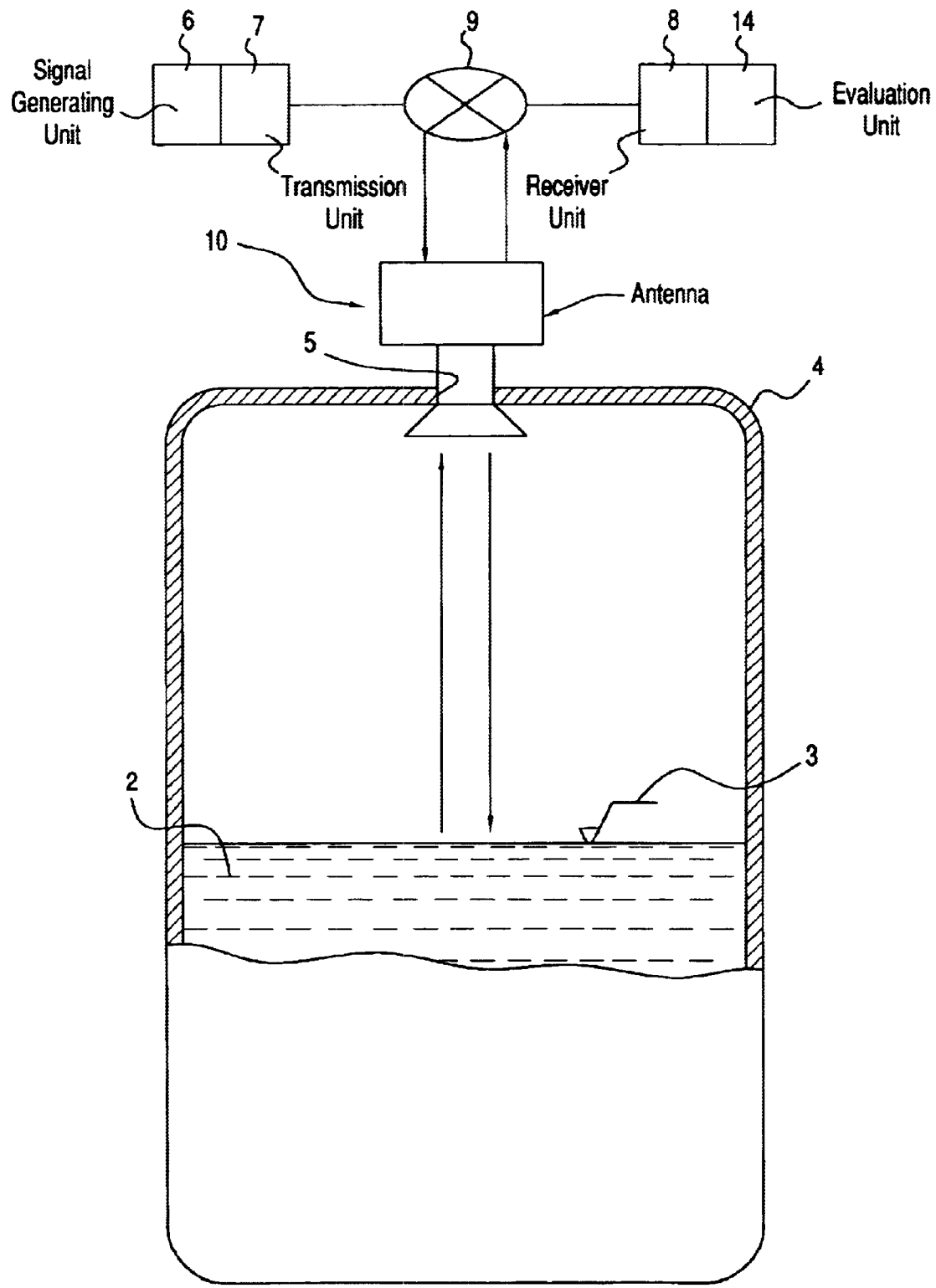
FIG. 1: which is a schematic illustration of the device of the invention.

The signals to be transmitted and the reflected signals are carried via a coaxial line 11. This line comprises an inner conductor 12 and an outer conductor 13. The inner conductor 12 is connected to the first end section 18 of the send line 17. To that end, a leadthrough 23, for instance a glass leadthrough, is provided in the back wall 15. The leadthrough 23 has an insulation layer, which assures that in the region of the leadthrough 23, no electrically conductive connection exists between the inner conductor 12 and the back wall 15.

The antenna 10 is made from an electrically conductive material, such as aluminum or special steel, or from a plastic coated with a conductive material. The waveguide 16 of the antenna 10 has a circular cross section and—as already noted above—is closed off on one face end by the back wall 15. The antenna 10 consequently has the geometry of a short-circuited round waveguide.

Figure 2:
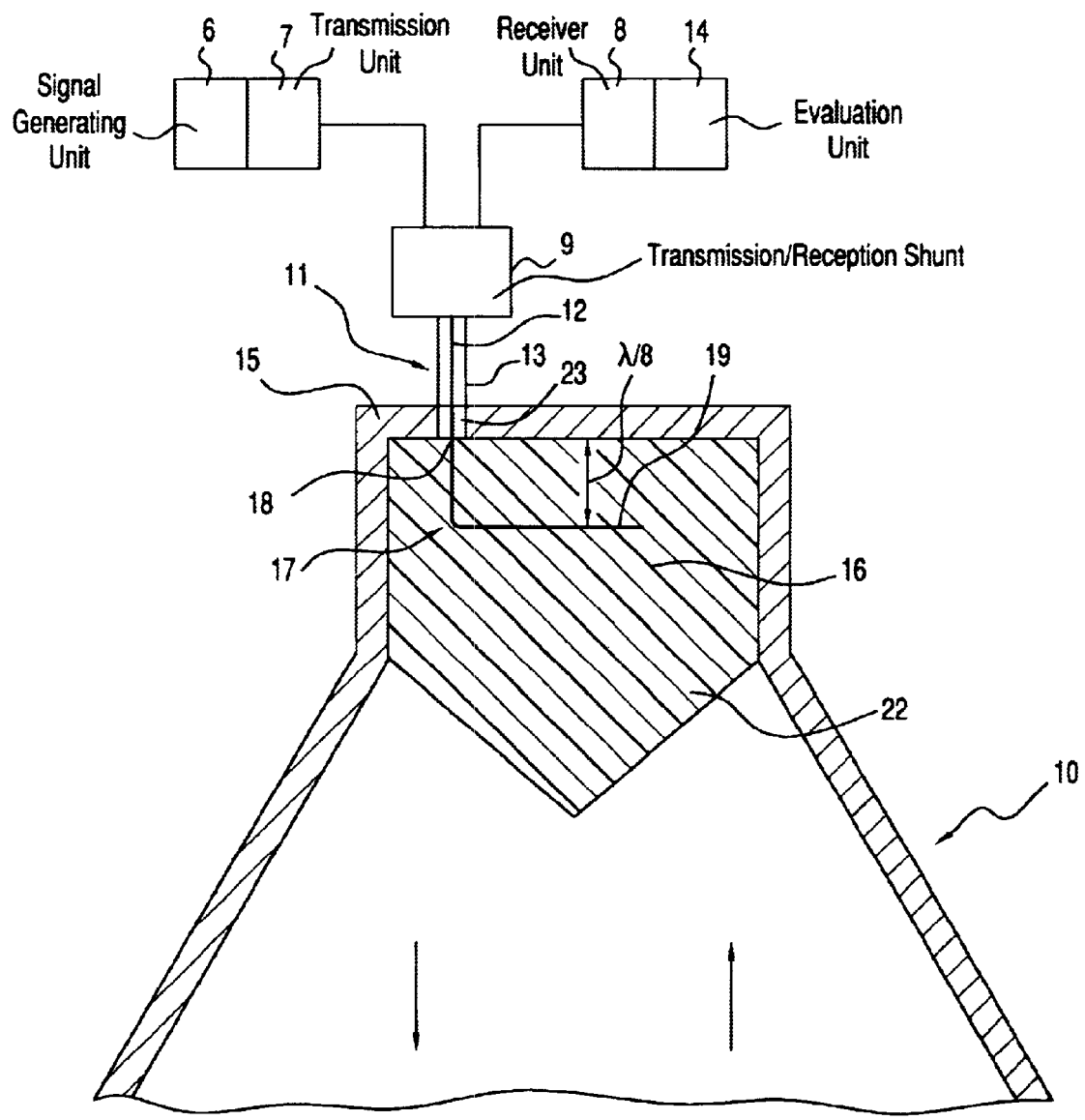
FIG. 2: which is a schematic illustration of a first embodiment of the device of the invention.

The send line 17 is embodied as a hook bent at a right angle, and the second end section 19 of the send line 17 extends essentially parallel to the back wall 15 of the antenna 10. The spacing between the second end section 19 and the back wall 15 is approximately $\lambda/8$; $\lambda$ is the wavelength of the high-frequency signals, of a predetermined mean frequency, that are carried in the waveguide 16. The send line 17 is embedded in a dielectric 22. In the case shown, the dielectric 22 fills up the waveguide 16 of the antenna 10 completely, and moreover it is tapered conically in the direction of the broadcasting of the signals. In the view shown in FIG. 2, the device of the invention is accordingly used in conjunction with a horn antenna. It is understood that the device of the invention can also be used in conjunction with a rod antenna. Both embodiments additionally improve the broadcast characteristic of the antenna 10, but otherwise are not absolutely necessary for the ability of the device of the invention 1 to function.

The antenna 10 also has a securing device, by means of which the device of the invention can be secured to a container 4. In the case shown, a male thread serves as the securing means. It is understood that the mounting can also be done by means of a flange.

Figure 3:
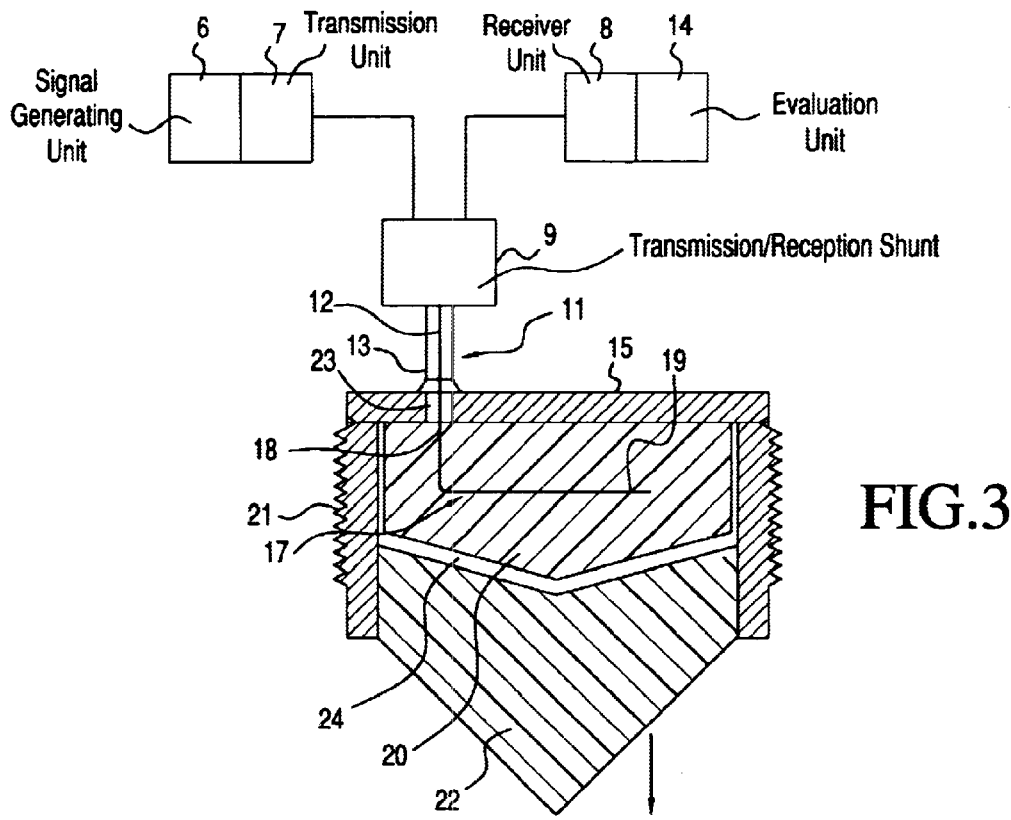
FIG. 3: which is an illustration, shown partly in longitudinal section, of a second advantageous embodiment of the device of the invention.
Figure 4:
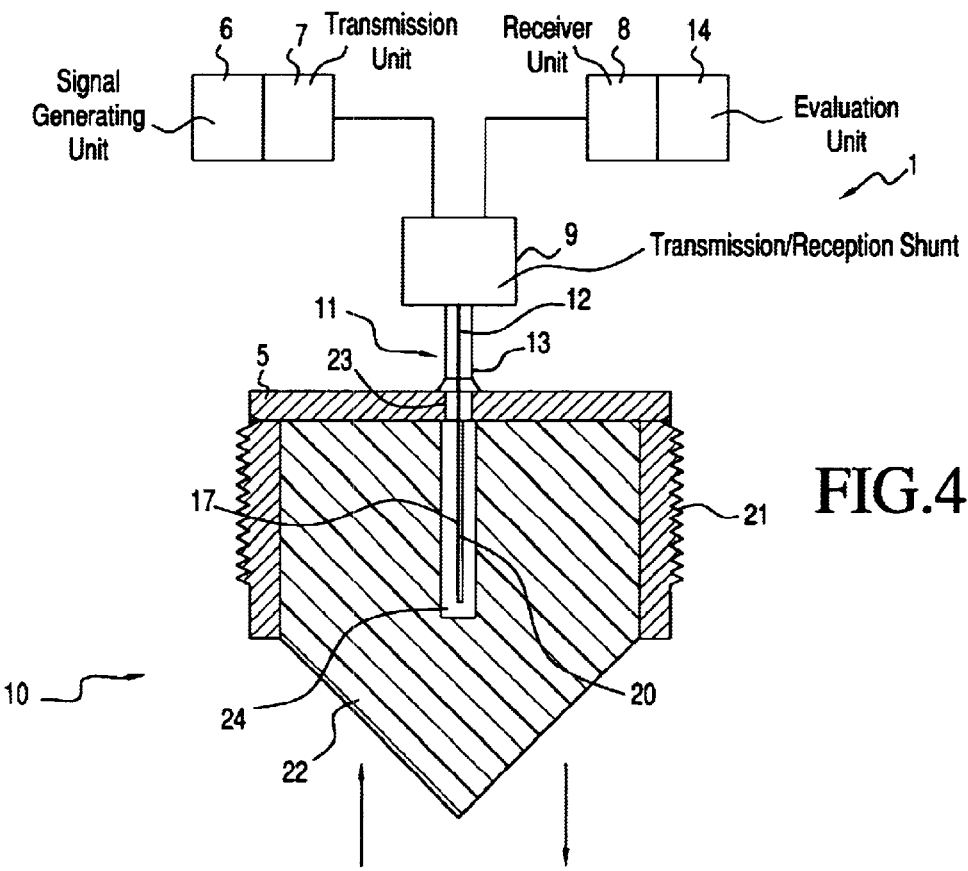
FIG. 4: which is a section through the embodiment shown in FIG. 3, with the section rotated 90° from the section shown in FIG. 3.

Instead of a send line 17 extending freely in the waveguide 16 of the antenna 10 and secured only on its first end 18, a printed circuit board 20 on which the send line 17 is disposed can also be used. This embodiment is shown schematically in FIGS. 3 and 4. For securing the printed circuit board 20, a groove is for instance provided in the back wall 15; further grooves are provided on the inside face of the waveguide, at the corresponding points diametrically opposite one another. The electrical contact between the first end section 18 of the send line 17 and the inner conductor 12 is made analogously to the provision of electrical contact for the send line 17 without a printed circuit board 20.

List of Reference Numerals

1 Device of the invention
2 Filling substance
3 Surface of the filling substance
4 Container cap
5 Opening
6 Signal generating unit
7 Transmitter unit
8 Receiver unit
9 Transmission/reception shunt
10 Antenna
11 Coaxial line
12 Inner conductor 13 Outer conductor
14 Evaluation unit
15 Back wall
16 Waveguide
17 Send line
18 First end section
19 Second end section
20 Printed circuit board
21 Securing device
22 Dielectric
23 Leadthrough
24 Hollow chamber

What is claimed is:

1. A device for determining the fill level of a filling substance in a container, comprising:

a signal generating unit which generates high-frequency signals;

a transmitter/receiver unit connected to said signal generating unit;

an antenna connected to said transmitter/receiver unit for receiving and transmitting said high-frequency signals, and for receiving the signals reflected from the surface of the filing substance, said antenna having a waveguide, a back wall and a send line provided on said back wall, said send line extending into said waveguide, and defining a first end section and a second end section; and a coaxial line having an inner conductor and an outer conductor for carrying the signals, said inner conductor being connected to said first end section, wherein:

said second end section being disposed freely and substantially parallel to said back wall; and a space is defined between said second end section and said back wall, said space is essentially $\lambda/8$, where $\lambda$ is the wavelength of said high-frequency signals generated by said signal generating unit.

2. The device as defined in claim 1, wherein:

said coaxial line is flush at its front with said back wall.

3. The device as defined in claim 1, wherein:

said first end section and said second end section are disposed essentially perpendicular to one another.

4. The device as defined in claim 1, further comprising:

a printed circuit board, and wherein:

said send line is disposed on said printed circuit board secured in said antenna.

5. The device as defined in claim 1, wherein:

said antenna has a dielectric which fills said waveguide at least in the vicinity of said send line.

6. The device as defined in claim 1, further comprising:

a securing device, wherein:

said antenna is secured to the container by said securing device.

* * * * *